United States Patent
Fulknier et al.

(10) Patent No.: US 9,668,193 B2
(45) Date of Patent: May 30, 2017

(54) MOBILE ROUTER DEVICE

(71) Applicants: John Fulknier, Charlestown, MA (US); Brian J. Smith, Somerville, MA (US)

(72) Inventors: John Fulknier, Charlestown, MA (US); Brian J. Smith, Somerville, MA (US)

( * ) Notice: Subject to any disclaimer, the term of this patent is extended or adjusted under 35 U.S.C. 154(b) by 820 days.

(21) Appl. No.: 13/927,033

(22) Filed: Jun. 25, 2013

(65) Prior Publication Data

US 2013/0286945 A1    Oct. 31, 2013

Related U.S. Application Data

(63) Continuation of application No. 12/807,549, filed on Sep. 7, 2010, now Pat. No. 8,503,363, which is a continuation of application No. 11/497,892, filed on Aug. 2, 2006, now Pat. No. 7,813,314.

(60) Provisional application No. 60/595,747, filed on Aug. 2, 2005.

(51) Int. Cl.
| | |
|---|---|
| *H04W 40/00* | (2009.01) |
| *H04L 12/701* | (2013.01) |
| *H04L 12/773* | (2013.01) |

(52) U.S. Cl.
CPC ............. *H04W 40/00* (2013.01); *H04L 45/00* (2013.01); *H04L 45/60* (2013.01)

(58) Field of Classification Search
None
See application file for complete search history.

(56) References Cited

U.S. PATENT DOCUMENTS

| | | |
|---|---|---|
| 5,771,229 A | 6/1998 | Gavrilovich |
| 5,812,531 A | 9/1998 | Cheung et al. |
| 6,006,089 A | 12/1999 | Sasaki et al. |
| 6,252,883 B1 | 6/2001 | Schweichart et al. |
| 6,253,247 B1 | 6/2001 | Bhaskar et al. |
| 6,295,276 B1 | 9/2001 | Datta et al. |
| 6,311,279 B1 | 10/2001 | Nguyen |

(Continued)

FOREIGN PATENT DOCUMENTS

| | | |
|---|---|---|
| EP | 1175757 B1 | 1/2005 |
| WO | WO2004070970 A1 | 8/2004 |

OTHER PUBLICATIONS

D.S. Phatak et al. "A novel mechanism for data streaming across multiple IP links for improved throughput and reliability in mobile environments" IEE INFOCOM, 2002.

(Continued)

*Primary Examiner* — Kwang B Yao
*Assistant Examiner* — Adam Duda
(74) *Attorney, Agent, or Firm* — Edward L. Kelley

(57) ABSTRACT

A wireless mobile router (140) includes wireless network interfaces (202) and (218) attached to a network controller (142). The wireless network interface (202) communicates with a cellular network (110) to access cellular network services. The wireless network interface (218) and the network controller (142) comprise a WLAN (170) or PAN (180) and a network router hosting a plurality of client devices. Each client device may access a wide area network, WAN over the cellular network. The wireless mobile router (140) is configured to exchange various cellular network signals with various WLAN and PAN networks. The wireless mobile router (140) is particularly suitable for use in a vehicle or at locations where WAN access is not readily available.

18 Claims, 2 Drawing Sheets

(56) References Cited

U.S. PATENT DOCUMENTS

| | | |
|---|---|---|
| 6,411,632 B2 | 6/2002 | Lindgren et al. |
| 6,452,910 B1 | 9/2002 | Vij et al. |
| 6,483,852 B1 | 11/2002 | Jacquet et al. |
| 6,490,256 B1 | 12/2002 | Jones et al. |
| 6,493,341 B1 | 12/2002 | Datta et al. |
| 6,546,425 B1 | 4/2003 | Hanson |
| 6,560,443 B1 | 5/2003 | Vaisanen et al. |
| 6,563,821 B1 | 5/2003 | Hong et al. |
| 6,574,481 B1 | 6/2003 | Rathnasabapathy et al. |
| 6,600,743 B1 | 7/2003 | Lee et al. |
| 6,636,516 B1 | 10/2003 | Yamano |
| 6,747,964 B1 | 6/2004 | Bender |
| 6,757,269 B2 | 6/2004 | Dorenbosch et al. |
| 6,763,226 B1 | 7/2004 | McZeal |
| 6,778,495 B1 | 8/2004 | Blair |
| 6,804,532 B1 | 10/2004 | Moon et al. |
| 6,816,579 B1 | 11/2004 | Donovan et al. |
| 6,842,446 B2 | 1/2005 | Everson et al. |
| 6,850,512 B1 | 2/2005 | Bishop et al. |
| 6,862,500 B2 | 3/2005 | Tzamaloukas |
| 6,925,378 B2 | 8/2005 | Tzamaloukas |
| 6,934,266 B2 | 8/2005 | Dulin et al. |
| 6,963,579 B2 | 11/2005 | Suri |
| 6,980,524 B1 | 12/2005 | Lu et al. |
| 6,999,458 B2 | 2/2006 | Fowler |
| 6,999,785 B2 | 2/2006 | Kito |
| 7,006,481 B2 | 2/2006 | Terry |
| 7,010,298 B2 | 3/2006 | Seedman et al. |
| 7,010,303 B2 | 3/2006 | Lewis et al. |
| 7,016,682 B2 | 3/2006 | Won et al. |
| 7,036,143 B1 | 4/2006 | Leung et al. |
| 7,068,624 B1 | 6/2006 | Dantu et al. |
| 7,068,669 B2 | 6/2006 | Abrol et al. |
| 7,076,365 B2 | 7/2006 | Tzamaloukas |
| 7,079,853 B2 | 7/2006 | Rathnasabapathy et al. |
| 7,082,467 B2 | 7/2006 | Border et al. |
| 7,089,312 B2 | 8/2006 | Liu et al. |
| 7,092,399 B1 | 8/2006 | Cheriton |
| 7,120,148 B1 | 10/2006 | Batz et al. |
| 7,130,625 B2 | 10/2006 | Akgun et al. |
| 7,133,404 B1 | 11/2006 | Alkhatib et al. |
| 7,136,645 B2 | 11/2006 | Hanson et al. |
| 7,139,841 B1 | 11/2006 | Somasundaram et al. |
| 7,143,169 B1 | 11/2006 | Champagne et al. |
| 7,251,460 B2 | 7/2007 | Khatri |
| 7,317,896 B1 | 1/2008 | Saxena et al. |
| 7,349,413 B2 | 3/2008 | Hong et al. |
| 7,376,135 B2 | 5/2008 | Andries et al. |
| 7,417,996 B2 | 8/2008 | Hong et al. |
| 7,417,998 B2 | 8/2008 | Lee |
| 7,468,968 B2 | 12/2008 | Anders et al. |
| 7,493,381 B2 | 2/2009 | Garg |
| 7,508,754 B1 | 3/2009 | Sankaranaraynan et al. |
| 7,539,175 B2 | 5/2009 | White et al. |
| 7,542,456 B2 | 6/2009 | Garg et al. |
| 7,551,590 B2 | 6/2009 | Haller et al. |
| 7,551,615 B2 | 6/2009 | Trumper et al. |
| 7,653,391 B2 | 1/2010 | Kobayashi |
| 7,995,516 B2 | 8/2011 | Zhou et al. |
| 8,132,249 B2 | 3/2012 | Bichot et al. |
| 2002/0010866 A1 | 1/2002 | McCullough et al. |
| 2002/0122394 A1 | 9/2002 | Whitmore |
| 2003/0016636 A1 | 1/2003 | Tari et al. |
| 2003/0223450 A1 | 12/2003 | Bender et al. |
| 2004/0017794 A1 | 1/2004 | Trachewsky |
| 2004/0032910 A1 | 2/2004 | Horng et al. |
| 2004/0105449 A1 | 6/2004 | Jung et al. |
| 2004/0196798 A1 | 10/2004 | Abousleman |
| 2004/0203740 A1 | 10/2004 | Won et al. |
| 2004/0266348 A1 | 12/2004 | Deshpande et al. |
| 2006/0068546 A1 | 3/2006 | Fischer |
| 2008/0186897 A1* | 8/2008 | Rune ............... H04L 12/4633 370/315 |

OTHER PUBLICATIONS

Hsieh et al. "A transport layer approach for achieving aggregate bandwidths on multi-homed mobile hosts" MOBICOM Sep. 23-26, 2002.

Salkintzis et al. WLAN-GPRS Integration for Next-Generation Mobile Data Networks IEEE Wirelss Comm. Oct. 2002.

* cited by examiner

MOBILE ROUTER DEVICE

CROSS REFERENCE TO PRIOR APPLICATIONS

This application is a continuation of application Ser. No. 12/807,549, filed on Sep. 7, 2010, now U.S. Pat. No. 8,503,363, entitled MOBILE ROUTER DEVICE, which is a continuation of application Ser. No. 11/497,892, now U.S. Pat. No. 7,813,314 entitled MOBILE ROUTER DEVICE, filed on Aug. 2, 2006 which claims priority under 35 U.S.C. 119(e) based upon Provisional Application Ser. No. 60/595,747, entitled INTERNET MOBILE ROUTER DEVICE, filed Aug. 2, 2005, all of which are incorporated herein by reference in their entirety.

BACKGROUND OF THE INVENTION

Field of the Invention

The present invention relates to a wireless network router that interfaces with a cellular network and forms a wireless local area network surrounding the wireless network router. In particular, the wireless network router is configured for mobile use and includes one or more cellular network transceivers, to maintain a substantially continuous connection with a cellular wireless network and exchanges content and other data between the cellular network and the wireless local area network created by the router.

Description of the Related Art

Mobile computer and other mobile electronic device users are increasingly relying on continuous access to Wide Area Networks, (WAN's), such as the world wide web, (www), Internet, Intranets, etc. to access data and software tools and to remain in continuous communication with others, e.g. by email, instant message, telephone, etc. Recently, wireless communication systems utilizing designated radio frequency bands have allowed mobile devices to interconnect with a WAN whenever the mobile device is within the usable range of a compatible wireless network.

Conventional wireless local area networks, (WLAN) are often deployed inside structures such as homes, offices and public and commercial buildings for networking with client mobile computers and other client mobile electronic devices. In addition, larger wireless network deployment over a campus or city is also known to network with a large number of client mobile computers and other client mobile electronic devices. Generally a wireless network deployed over a usable range includes a wire network interface to a WAN e.g. through an internet server. In these wireless networked areas a client device can usually access a WAN through the wire network interface and may have continuous access to a WAN as needed as long as the client device remains within the usable range of the wireless network.

A typical problem faced by the average wireless local area configured client device user is that when the client device leaves a WLAN zone, the client device can not communicate with a WAN or WLAN to access network services. This problem has been addressed by cellular network providers by providing cell phones and PDA's with access to a WAN over a cellular network and by equipping cell phones and PDA's with basic email and web content display and editing functionality. However cell phones and PDA's are not equipped to perform even routine computer tasks and most portable computers are not equipped with cellular network interfacing gear. Accordingly, there is still a need to provide WAN access to mobile users wishing to perform routine computer tasks in places where network access is not available, e.g. when traveling in a vehicle, watercraft or aircraft or when traveling for work or pleasure.

Generally, cellular networks provide broad or global coverage areas and provide WAN access and other services to cellular configured client devices. However, there is no convenient way for a WLAN configured client device, e.g. a lap top computer or other portable electronic device to access a cellular network and take advantage of the services provided by the cellular network. In addition, satellite telecommunication networks, (STN), provide broad or global coverage areas and provide WAN access and other services to STN configured devices. However, there is no convenient way for a WLAN configured client device, e.g. a lap top computer or other portable electronic device to access a STN and take advantage of the services provided by the STN.

BRIEF SUMMARY OF THE INVENTION

The present invention overcomes the problems cited in the prior art by providing a mobile network router (140) having a network controller (142) configured as a PC board or mother board. The router (140) includes a first wireless network interface device (202) configured as a cellular network interface device for exchanging network signals with a cellular network such as an EVDO configured cellular network. In particular, the router may access a WAN 100 through the cellular network.

The router (140) further includes a second wireless network interface device (218) configured to exchange second wireless network signals with a second wireless network, such as a wireless local area network WLAN (170) configured as a Wi-Fi, WiMax, or other WLAN network or configured as a personal area network, (PAN) 180 such as a Bluetooth, ZigBee, UWB or other PAN network. In addition, network controller (142) is configured as a router for hosting a plurality of WLAN or PAN configured client devices and for directing network traffic between the client devices and a cellular network to access a WAN.

Specifically, the router (140) is configured to exchange signals between wireless networks of different configurations by exchanging wireless network signals with the first wireless network and the network controller (142) using the first wireless network interface device (202) and between the second wireless network and the network controller (142) using the second wireless network interface device (218). The router controller (142) then converts the first wireless network signals to the configuration of second wireless network signals and converts the second wireless network signals to the configuration of first wireless network signals. Thereafter, network traffic is directed between the first wireless network and the second wireless networks.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
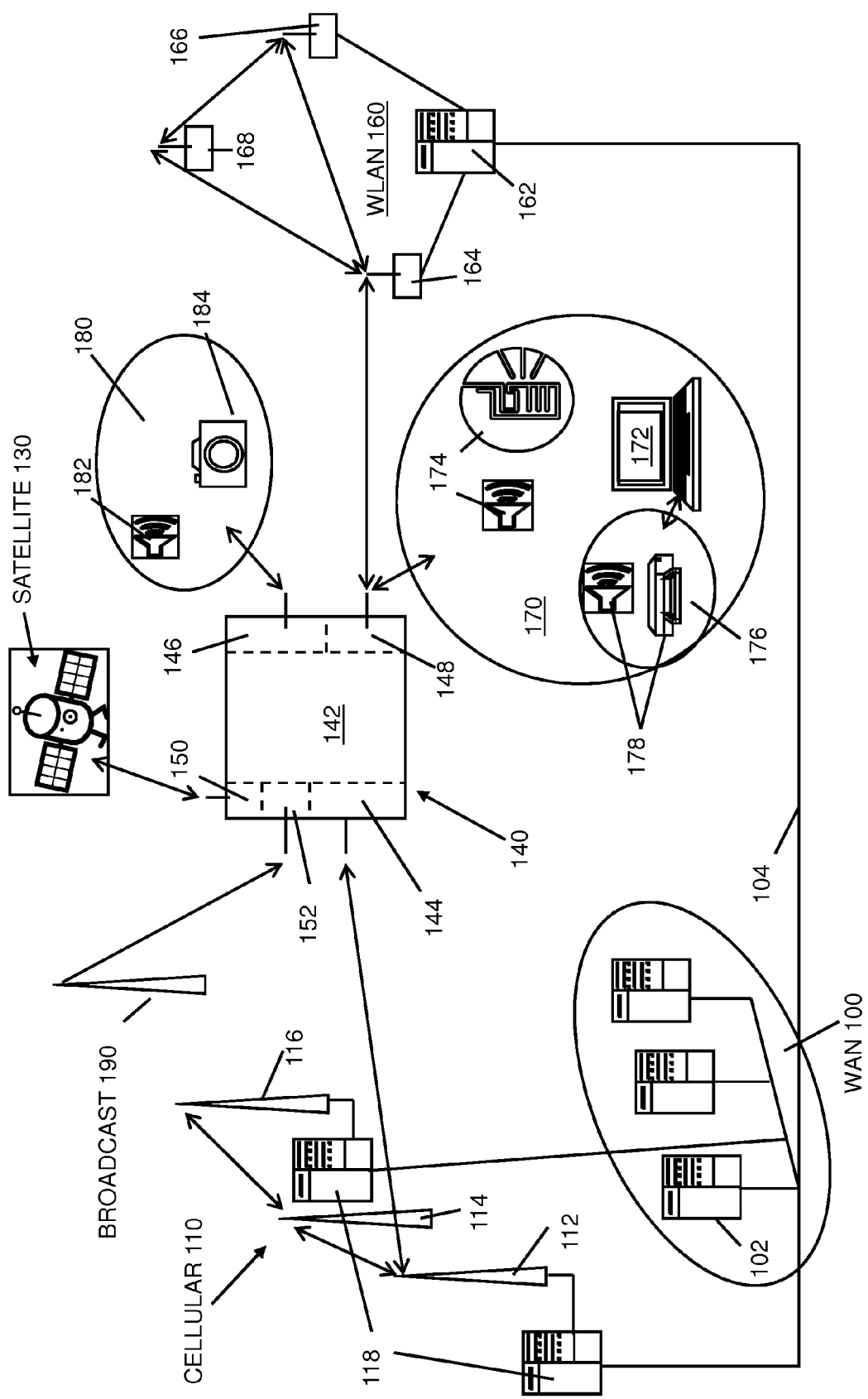
FIG. 1 illustrates a schematic representation of one example of a network environment including a mobile router according to the present invention.

Turning to FIG. 1, one example of a wireless network environment is shown schematically. The network environment includes a wide area network WAN (100). The WAN generally comprises a plurality of network devices (102), e.g. servers, digital data storage devices, telephone switching gear and network traffic controllers, all interconnected by a wire and sometimes wireless, e.g. microwave, infrastructure (104), such as the world wide web, (www), and other global telecommunications infrastructures. The WAN network (100) comprises a host to many network clients with each network client having a unique network ID such as an Internet Protocol Address, (IP Address), a Uniform Resource Locator, (URL), an email address, a telephone number etc.

Generally communication signals passed over the WAN network (100) include, digital and analog electrical signals generally transmitted through the network infrastructure and generally being communicated from one specific client device to another or from one client device to many specific client devices. The digital and analog signals may include a telephone call between two users, an email sent from one client device to one or more other client devices or a client browser request to access to a particular server or network client device to exchange data files there between.

Generally, network interface elements are included local to or incorporated within each client device. In addition, the WAN (100) and infrastructure (104) includes various network interface elements. Network interface elements are used to format network signals, to associate a network address to a client device network, and generally to allow network signals to be exchanged between client devices of many types and configurations. A common wire network interface element is the Ethernet interface module installed in many client and host devices. An Ethernet interface module generally operates according to the IEEE standard 802.3 to divide data into frames or packets and format the frames according to a communication protocol such as the Transmission Control Internet Protocol, (TCP/IP). Of course other wire network interface device types are also in use and usable with the present invention.

In addition, the WAN (100) includes network control elements configured to interface with the infrastructure (104) and with other host networks, to direct network traffic, to control access to the network, to measure network parameters etc. Typical WAN network control elements comprise network servers configured to establish a host/client relationship with many thousands of client devices and to manage signal exchanges there between.

The network environment also includes a cellular network, generally (110). The cellular network (110) comprises a plurality of wireless network access points, (112, 114, 116) configured as radio transceivers. In the example of FIG. 1, a first access point comprises a base station (112). Generally the base station (112) is in communication with a cellular network controller or router (118). The network controller (118) may comprise a computer or server positioned local to the base station (112) and connected to the WAN (100) via a wire or microwave link. Alternately, the base station (112) may be connected to the WAN via a wire or microwave link and the network controller or router (118) may reside anywhere on the WAN (100). In addition, each cellular access point (112, 114, 116) exchanges wireless signals with other cellular access points to communicate with the base station (112) and network controller (118).

The cellular network controller (118) controls communication traffic on the cellular network. In particular, the cellular network is a host network having a plurality of client devices. The cellular network controller (118) controls the network traffic to each client device and may provide different network services to different client devices. In addition, the cellular network controller (118) may provide a cellular network client device with access to the WAN (100).

Generally, cellular network access points (112, 114, 116), (cell towers), comprise one or more radio transceivers, usually elevated above the ground, capable of providing cellular network coverage over a useful range. Each cellular access point may communicate with a plurality of cellular client devices such as any device configured according to the cellular network standards, such that each cellular client device located within the useful range of an access point is able to exchange signals with the cellular network and if needed with a WAN by communicating with the WAN over the cellular network. Moreover, the cellular network useful range may extend over a very wide area when the base station (112) and other access points (114, 116) are configured to exchange radio signals with adjacent access points to thereby relay radio signals between the base station (112) and every other cell sight (114, 116). Accordingly, the cellular network provides a wireless communication infrastructure for communicating with a plurality of wireless client devices disposed within the useful range of any cellular access point and for connecting each client wireless device to a WAN (100).

Generally, a cellular network is configured to operate using radio frequencies ranging from about 0.8-2.2 GHz. In addition, a cellular network is configured to operate using a cellular network message exchange or communication protocol standard such as any one of the Global System for Mobile Communications (GSM), General Packet Radio Service (GPRS), Universal Mobile Telecommunications System (UMTS), High-Speed Downlink Packet Access (HSDPA), High-Speed Uplink Packet Access (HSUPA), Code Division Multiple Access (CDMA), Evolution-Data Optimized (EVDO), Enhanced Data Rates for GSM Evolution (EDGE), 3GSM, Digital Enhanced Cordless Telecommunications (DECT), Digital AMPS (IS-136/TDMA), or Integrated Digital Enhanced Network (iDEN), etc.

In practice, different cellular network providers use different radio frequency bands and or different network exchange or communication protocol standards. However, it is typical that a single cell tower may include a plurality of cellular access points each using a different radio frequency band and or a different network exchange or communication protocol standard such that the cellular network (110) may actually comprise a plurality of cellular networks operating in the same region. Conversely, a typical cellular client device, e.g. a cell phone or PDA includes a network interface device configured to communicate with only one type of cellular network. In addition, each cellular client device is generally assigned a unique device ID, e.g. a phone number, to uniquely identify the device and to establish a one to one communication link between the cellular client device and another device via the access point and cellular network controller (118).

The wireless network environment may also include a Satellite Telecommunication Network, (STN) generally (130). The STN includes a ground-based base station and network controller, not shown, and at least one orbiting satellite access point configured with a transceiver for exchanging electromagnetic signals between the STN network controller and the satellite. In addition, the satellite may transmit or broadcast signals to ground based client devices or may exchange two way communication signals with ground based STN configured client devices. In one example, an STN may comprise the global position system, (GPS) used to transmit wireless signals from satellites to ground-based STN configured signal receivers for allowing each ground-based STN signal receiver to calculate its global position. Alternately, the STN may comprise one or more television or radio broadcast satellites configured to broadcast digitized television and radio signals, or any other digitized video and or audio signals, over a wide area to many ground based STN configured client device receivers. In addition, STN-configured client telephone and video phone devices are able to connect with other telephone/videophone exchanges through the ground-based STN network controller. In addition, the ground-based STN network controller may be in communication with the wire infrastructure (104) and the WAN (100) such that a ground-based STN-configured client device may gain access to a WAN (100) via a satellite transmission. As with other networks, the STN controller may control access to the STN network.

The network environment may also include one or more substantially permanent wireless local area networks, (WLAN) (160). Generally a permanent WLAN (160) comprises a wireless network access point formed at a base station (164). The permanent WLAN (160) may also comprise additional wireless access points (166) and (168) disposed to extend the useable range of the WLAN (160) and configured to communicate with the base station (164) using wireless and or wire connections to relay network signals to every access point (164, 166, 168). Each access point (164, 166, 168) includes a wireless transceiver configured to exchange communication signals with WLAN configured client devices and with other WLAN access points.

The base station (164) may include a network controller configured to host WLAN configured client devices. The network controller functions as a network router to assign each client device a network address and to control network traffic between the host base station (164) and client devices. The base station (164) usually connects with a server (162), which may also form the network controller, and the server (162) connects with the local wire infrastructure (104) to provide each client device with access to the WAN (100) over the WLAN (160).

Generally a permanent WLAN (160) may be installed inside a structure to provide wireless network access over the entire structure or a portion thereof. In another example, the permanent WLAN (160) may comprise a wide area wireless network, or Metropolitan Area Network, (MAN), spanning a campus or urban area with a plurality of access points and base stations (164, 166, 166) and may include more than one server (162) and more than one base station (164) and may be interconnected with wired local area networks as well.

Generally the WLAN (160) communication signals is based on the Wi-Fi or IEEE 802.11 communication standard, which defines how signals are to be formatted and communicated using radio wave frequencies in the range of 2.4-2.5 GHz and or 5.15-5.8 GHz. Conversely MAN network communication may use the microwave frequency based Worldwide Interoperability for Microwave Access, (WiMAx) or IEEE 802.16 communication standard, which defines how signals are formatted and communicated using microwave frequencies in the range of 2-11 GHz with WiMAx operating on 2.1 and 5.8 GHz.

In addition to the above listed networks, the network environment may further include a plurality of traditional public radio and television broadcast networks as well as a plurality of two-way radio voice and pager networks all generally represented by the network access point (190). In particular, the network access point (190) may comprise broadcast signals able to be received by properly configured radio or television signal receivers located within the usable network range, or the network access point (190) may comprise one or more transceivers used for two-way radio communication by military, public safety, municipal, corporate, and private radio network providers to communicate with any properly configured signal transceiver located within the usable network range. Generally the network access point (190) includes broadcast signals such as free radio, and television broadcast signals pay radio and television broadcast signals, selected two-way radio communication bands and various special purpose radio networks.

Mobile Router Interface Devices

According to the present invention, a mobile router (140) comprises a stand alone wireless network interface device configured to operate in the above described network environment. In particular, the mobile router (140) is configured to operate in a moving vehicle and to access one or more host wireless network access points as the vehicle traverses over a network environment. More specifically, the mobile router (140) is configured to seek a wireless network access point, to gain access to a host wireless network associated with the wireless network access point and to become a client of the host wireless network. Once the mobile router is a client of the host wireless network, the mobile router is configured to exchange network signals with the host wireless network. In particular, the mobile router (140) may be configured to become a client of one or more host wireless networks simultaneously.

The mobile router (140) is further configured as a wireless network access point configured to host one or more network configured devices, either inside the vehicle or local to the mobile router (140). The mobile router (140) comprises a wireless network controller and a wireless network base station configured to communicate with one or more wireless network configured client devices. Thus according to the present invention, the mobile router (140) comprises a client device on a first wireless network or on a plurality of first wireless networks and a host device communicating with one or more client devices on a second wireless network. Generally, the first wireless network is a substantially permanent and fixed network of the network environment, while the second wireless network is movable with the mobile router (140), e.g. in a moving vehicle, or the second wireless network is portable with respect to the fixed network environment infrastructure.

The mobile router (140) is configured to exchange first network signals with the first host wireless network or a plurality of first host wireless networks and to exchange second network signals with one or more second client devices. Moreover, the mobile router (140) is configured to reconfigure the first network signals into a configuration of the second network to provide second network signals and to reconfigure second network signals into the configuration of the first network(s) to provide first network signals as required to exchange signals between the first and second networks. The mobile router (140) is further configured to route first network signals from the first network(s) proper clients in the second network. The mobile router (140) also operates to receive network traffic from the clients of the second network and to aggregate second network traffic together and balance the second network traffic over connections with the first network or networks in order to increase communication bandwidth and or speed in accordance with instantaneous conditions of the first network or networks.

The mobile router (140) is configured to search for host wireless network access points and to select and connect with an optimal host wireless network access point, e.g. highest signal strength, lowest price, most secure, etc. Moreover, the mobile router (140) is configured to continuously or periodically monitor the network environment, to evaluate every available host wireless network access point, and to select and connect with a more optimal host wireless network access point if one becomes available. Moreover, the wireless router (140) is configured to change wireless access points and to change first networks in order to maintain a continuous connection with a WAN (100). In addition, the wireless router (140) is configured maintain wireless network host status with one or more first networks or to maintain wireless network host status with a single first network as a plurality of host devices in order to maintain a continuous connection with a WAN (100) or to direct network traffic to a plurality of host network access points simultaneously.

As shown in FIG. 1, the mobile router (140) includes a controller (142), and one or more wireless network interface devices, (144, 146, 148, 150, 152) mounted on the controller (142). Generally the network interfaces devices shown in FIG. 1 are each configured to communicate with a different network type and to exchange network signals of each different network type with the controller (142).

Each network interface device (144, 146, 148, 150, 152) comprises an antenna configured to receive analog electromagnetic wave signals in a particular frequency range and a receiver configured to convert the analog electromagnetic wave signals received into digital signals formatted as required for delivery to the controller (142). The receiver may also include a signal amplifier incorporated in the antenna, incorporated in the mobile router (140) or installed between an antenna (232) and the router (140).

Some or all of the network interface devices, (144, 146, 148, 150, and 152) also include a signal transmitter configured to transmit analog electromagnetic wave signals in a particular frequency range and with a desired signal power amplitude through the antenna. Each signal transmitter is configured to receive digital signals from the controller (142) and to convert the digital signals into analog electromagnetic wave signals in a particular frequency range and formatted as required for radio transmission over the entire network usable range. The transmitter may also include a signal amplifier incorporated in the antenna, incorporated in the mobile router (140) or installed between the antenna (232) and the router (140).

In some instances, an entire network interface device (144, 146, 148, 150, 152) may be disposed external to the wireless router (140) and interfaced with the wireless router through the input/output I/O interface (228) or by wireless communication through another wireless interface device included in the mobile router (140). In particular some vehicles may be equipped with built-in antennas, GPS receivers, satellite radio and television receivers etc. and these elements may be used to interface with the mobile router (140) and deliver network services to client devices local to the vehicle.

Generally, the router (142) exchanges control, communication and power signals with each network interface device (144, 146, 148, 150, 152). The controller (142) may also process a communication signal received from a first network interface device over a first network type to reconfigure the communication signal to be transmitted over a second network interface device over a second network type. The controller (142) may also process the power signals, e.g. to process and reconfigure the proper signal strengths of wireless network signals, for each client in the second network and when retransmitting information from the first network or to monitor power conditions and to switch from external power to battery power, or to conserve energy, or to notify a user of a power problem, etc. The controller (142) may also process control signals as required to control communication signal traffic. In addition, the controller (142) is configured as one or more network routers operating to manage network communications with a plurality of client devices.

In one example according to the present invention, a first network interface device (144) may comprise a cellular network interface device configured to communicate with a cellular network (110). In particular, the network interface device (144) exchanges signals with one or more cellular network access points (112, 114, 116), gains access to and becomes a client of the cellular network (110), and if possible uses services of the cellular network (110) to gain access to the WAN (100), send or receive a fax, or establish an audio or video conference link with a device on the WAN (100) through the cellular networks (110).

A second network interface device (148) may comprise a WLAN interface device configured to communicate with a WLAN network (160). In particular, the network interface device (148) exchanges signals with the WLAN network using one or more access points, (164, 166, 168), gains access to and becomes a client of the WLAN network (160), and if possible to gain access to services of the WLAN network (160), e.g. to gain access to the WAN (100), or receive WLAN specific content from the WLAN (160).

In particular, the WLAN specific content may include SSID information and access point timing or signal strength and in conjunction with a known database of WLAN access point locations, may be used as another method of inferring the mobile router's location. If position is already known through some other means (such as GPS), then this database may be updated with the inferred position of a WLAN access point along with its SSID information.

A third network interface device (146) may comprise a personal area network, (PAN), interface device configured to communicate with one or more PAN networks or devices. In particular, the third network device (146) forms a host network to use all available client devices, such as any PAN configured client device such as Bluetooth devices or Ultra-Wide-Band (UWB) video screens etc. Furthermore, the mobile router (140) may comprise a client another PAN network such as a local personal computer (172) (or any local PDA or cellphone).

A fourth wireless network interface device (150) comprises an STN interface device configured to communicate with an STN network or network device (130). In particular, the network interface device (150) exchanges signals with the STN network access point, e.g. the satellite (130), to gain access to and become a client of the STN network (130), and if possible to gain access to services of the STN (130), e.g. to gain access to the WAN (100), for telephone and video conferencing, to access audio and video content, to determine GPS coordinates, etc.

A fifth wireless network interface device (152) may comprise one or more other wireless receivers or transceivers configured to communicate with two-way radio or pager networks or configured to receive radio and television broadcast channels from the access point (190) in FIG. 1. For example the network interface device (152) may comprise a tunable receiver for manually or automatically scanning or otherwise adjusting to receive an analog electromagnetic signal of a desired frequency, e.g. a conventional AM radio signal in the frequency range of 525 kHz to 1715 kHz or conventional FM radio and television signals in the frequency range of 30 MHz to 400 MHz, or another broadcast signal. Alternately, the network interface device (152) may comprise a tunable transceiver for exchanging two-way radio communication signals over a desired radio band e.g. a military, marine, municipal, citizen band, corporate, and amateur or other two-way radio network at selected frequencies.

In addition the mobile router (140) may include still further network interface devices configured for any other specialized wireless network communication such as Radio Frequency Identification, (RFID), infrared telecommunication bands, visible telecommunication bands such as laser emitters and receivers an any other wireless communication device. In addition, the mobile router (140) may also include one or more wire network interface devices such as an Ethernet interface device for interfacing with a wired network such as a local area network LAN when one is available.

Mobile Router Client Device

Further according to the present invention, the mobile router (146) comprises a host network device for hosting one or more client devices. In particular, the WLAN interface device (148) includes a transceiver configured to communicate with WLAN configured client devices (172, 174) and to exchange WLAN configured network signals therewith. In addition, the controller (142) is configured as a WLAN network controller and router for accepting client devices onto the WLAN network designated (170), and controlling communication traffic to each client device therein, (172, 174). In addition the controller (142) is configured to receive a communication signal from a WLAN configured client device, e.g. an email message, and to reconfigure the email message for transmission to a cellular configured host device, e.g. (110), for delivery to an email recipient via the WAN (100). Conversely, the controller (142) is configured to receive a communication signal, e.g. a return email message, from a cellular configured host network, e.g. (110), and reconfigure the return email message for transmission to a WLAN configured client device, eg. (172, 174).

As shown in FIG. 1 the WLAN usable network region (170) includes client devices (172), a WLAN configured lap top computer, and (174), WLAN configured speakers or head sets, telephones, video display devices, PDA's, printers, scanners, faxes, memory devices, etc. Generally the WLAN may operate according to one or more of the Wi-Fi, IEEE 802.11, WiMax, IEEE 802.16, wireless Ethernet IEEE 802.3, or any other WLAN communications standards.

In addition, the WLAN configured client device (172) may comprise a network access point for a PAN network (176) which includes PAN configured client devices (178) such as audio speakers or headsets, PDA's, key board, mouse, printer, scanner etc.

In addition or alternately, the PAN network interface device (146) includes a transceiver configured to communicate with PAN configured client devices and to form a PAN network (180) to exchange signals with PAN configured client devices (182, 184) as well as PAN configured devices (176) and (178). In addition, the controller (142) is configured as a PAN network controller and router for accepting client devices onto the PAN network (180) and controlling communication traffic to each client device, (182), and (184). In addition the controller (142) is configured to receive a communication signal from a PAN configured client device, e.g. an email message from a PDA and reconfigure the email message for transmission to the cellular network (110) for delivery to recipient via the WAN (100). Conversely, the controller (142) is configured to receive a communication signal, e.g. a return email message, from the cellular network, (110), and reconfigure the return email message for transmission to a PAN configured client device, e.g. (182, 184). Generally the PAN network (180) may operate according to one or more of the Bluetooth, IEEE 802.15.1, ZigBee, IEEE 802.15.4, Ultra Wide Band, UMB, IEEE.802.15.3a or any other PAN communications standards.

The Network Controller

Figure 2:
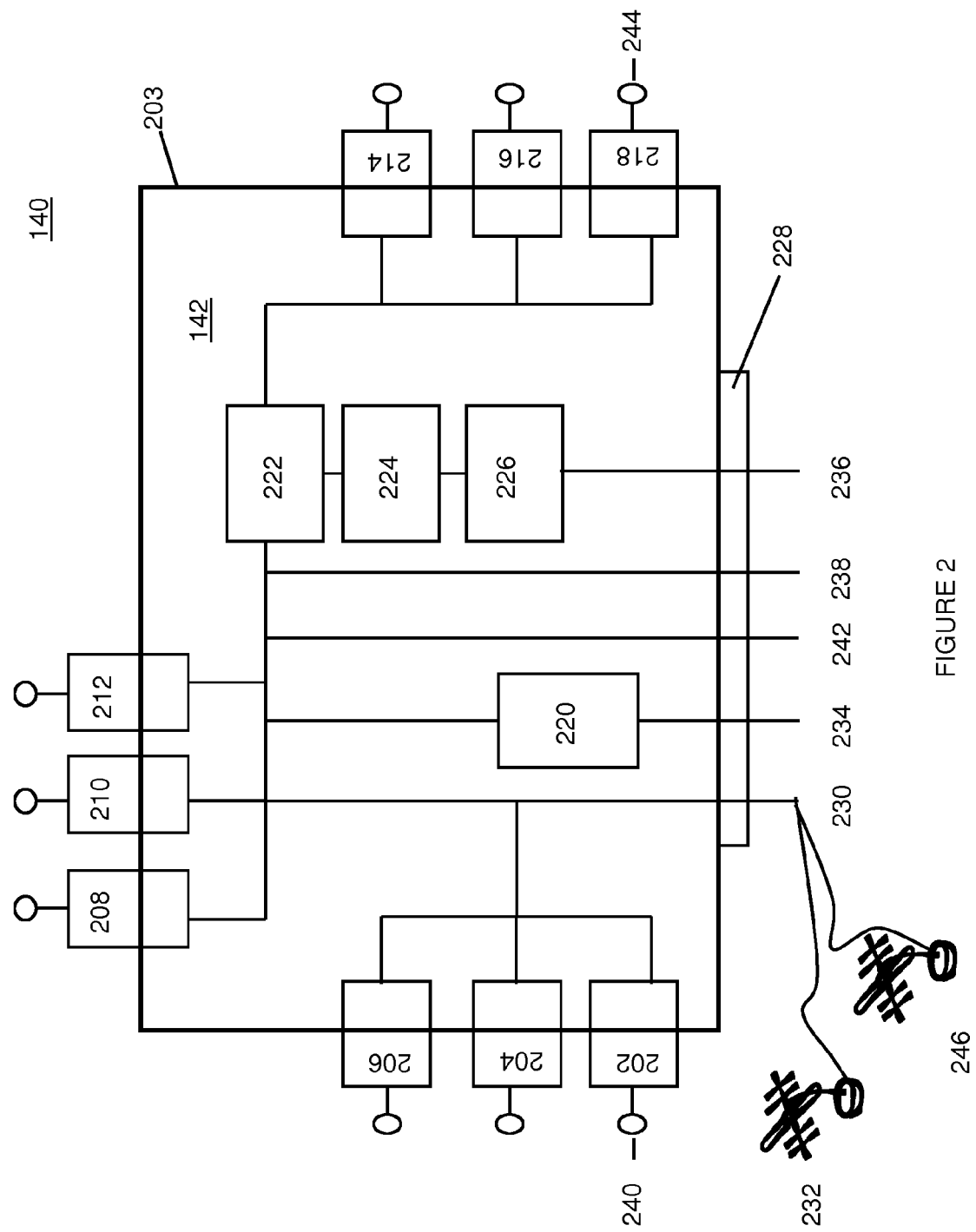
FIG. 2 illustrates a schematic representation of one example of a mobile router according to the present invention.

Turning now to FIG. 2 a mobile router (140) according to the present invention comprises a controller (142) configured as a printed circuit board or mother board having various integrated circuit elements formed thereon and attached thereto. The mobile router (140) also includes a plurality of network interface devices, (202, 204, 206, 208, 210, 212, 214, 216, 218 and 220) interfaced with the controller (142) and in communication therewith.

Generally the controller (142) and each of the network interface devices (202-220) are housed within a conventional electronic module enclosure (203) configured to protect the enclosed elements from contaminates, mechanical damage, including shock, moisture, electromagnetic emissions, electrical shock, and other hazards, as well as to serve as a common ground plane, all as is well known in the art. Generally, a network interface device (202-220) may be configured in a number of different embodiments depending on the availability and complexity of the interface device. However the network interface devices may comprise any one of the following configurations including a combination of more than one configuration. A separate printed circuit board, such as a daughter board attached to the controller (142). Printed and additional circuit elements formed integral with the controller mother board. Circuit elements contained within a central microprocessor unit, (CPU) (222). A Portable Computer, (PC), card installed within a card slot provided through the enclosure (203) and interfaced with the controller (142) by a card slot interface. An external device communicating with the controller (142) over a serial or network interface.

The controller (142) includes a conventional digital microprocessor or CPU (222), e.g. offered by INTEL Corp, AMD Corp. MIPS Corp. etc. Alternately the CPU (222) may be a conventional Network Storage Processor or the like, specifically configured for network data processing. The controller (142) includes one or more digital memory modules (224) in communication with the microprocessor (222) for storing digital data and program instructions therein. The memory modules (224) may include one or more of various memory types such as random access memory, (RAM), read only memory ROM, FLASH ROM, various removable or permanent disk memories etc., and the memory modules (224) may be mounted on the controller (142), installed as PC cards or otherwise contained within or associated with the enclosure (203), including external devices communicating with the controller (142).

The controller (142) further includes a power module (226) for controlling the distribution of power throughout the mobile router (140). The power module (226) may be connected to an external power source e.g. a conventional AC wall outlet or a conventional 6, 12, 40 or other volt vehicle power outlet, or any other external power source that is suitably configure to deliver power to the power module (226), or the power module (226) may include internal power source elements, e.g. a battery, fuel cell battery charging circuit etc. Generally the power module interfaces with the microprocessor 222 and with each element of the controller (142) through the controller PC board to deliver and control power as needed, and if desired to include power saving functionality such as selecting a different power source, reducing power consumption, activating power in response to various inputs etc., all in accordance with predefined power controlling software controlling parameters.

The mobile router (142) further includes a conventional wire connecting input output I/O interface (228). The I/O interface (228) includes a plurality of wire connectors supported by the enclosure (203) for connecting and communicating with external devices. In particular, the I/O interface (228) includes one or more antenna interfaces (230). Each antenna interface (230) connects with an external antenna (232, 246) specifically tuned as an electromagnetic or magnetic wave receiving and transmitting device for a desired wireless communication channel or frequency range and configured to produce an analog electrical signal in response to electromagnetic or magnetic waves being received thereby or to emit electromagnetic or magnetic waves in response to an analog electrical signal. In addition, the external antennas (232, 246) or antenna interfaces (230) may include a signal amplifier for amplifying the analog electrical signal produced by or delivered to the antenna. In addition, each wire connected between the external antenna (232) and a wireless network interface element (202-218) is preferably configured to shield and properly ground the antenna analog signals from external interference and disturbance.

The I/O interface (228) may also include a wire network interface (234) including one or more wired network connectors for connecting the mobile router (140) directly to a wired network such as a local area network, LAN or WAN or to any other wire network configured device including a computer, server, data storage device, PDA, printer, scanner, video display device, audio playback system, camera, telephone, router, wireless network access point, external antenna, etc. In one example, the wired network interface device (234) is an Ethernet network interface and the mobile router (140) includes an Ethernet network interface device (220). The Ethernet interface device (220) may comprise a PC card in a card slot; a circuit formed on the controller PC board (142) or may be incorporated within the CPU (222).

Additionally, The mobile router (140) may also have universal serial bus (USB), Firewire (IEEE 1394), IDE, Serial-ATA interface devices which provide for interfacing to local data storage devices (disks) or other peripherals. Serial RS232/422/485 and GPIB (IEE488) interface devices can interface with other peripherals, and the data to and from these networks can be routed to and from any other connecting network. Furthermore, local peripherals for control and setting of the mobile router or for user input/output may exist. These may include speaker outputs, a video screen, a microphone, or a user-control (buttons, etc.) on the router itself. All of these peripherals can be routed to any of the other networks as well. (For instance, audio or video data from any network can go to the local peripheral in addition to being routed to attached network devices.)

The I/O interface (228) includes one or more external power input connectors (236) for connecting to external power sources. The I/O interface (228) may include one or more wire ports (238) configured for serial or parallel communications between the CPU (222) and an external device, e.g. using an USB or RS232 serial communication technique. The wire communication ports (238) may be used to interface with a computer, server, data storage device, PDA, printer, scanner, video display device, audio playback system, camera, telephone, router, wireless network access point, external antenna, etc. The I/O interface (228) may also include one or more analog or digital wire ports (242) configured for connecting with an audio, video, telephone, or other devices as may be required to exchange analog or digital signals therewith.

Generally each wireless network interface device (202-218) includes an integral antenna (240, 244) or an external antenna (232, 246). The antenna is configured to receive and or transmit or emit electromagnetic waves of a particular radio or microwave frequency. Each wireless network interface device (202-218) at least includes a receiver associated with the antenna for converting antenna signals into analog electrical signals and for converting the analog electrical signals into digital signals readable by the CPU (222). In addition, each wireless network interface device (202-218) may include a transmitter associated with the antenna for converting digital signals received from the CPU (204) into analog electrical signals delivered to the antenna to generate electromagnetic or magnetic wave signals and to transmit or emit the analog electromagnetic or magnetic wave signals into the surrounding area. In addition some wireless network interface devices (202-218) may be configured as tunable transceivers for tuning to a desired frequency for receiving various radio, television or microwave channels such as a radio or television stations or to select a two-way radio band. In other examples a tunable transceiver may be used to change cellular networks or to change WLAN networks.

In one example of a mobile router (140) according to the present invention one or more network interface devices (202, 204, 206) are configured as cellular network interface devices for exchanging electromagnetic wave signals with cellular access points, e.g. (112, 114, 116) in FIG. 1 and for becoming a client device on a cellular network. In addition, one or more network interface devices (214, 216, 218) are configured as wireless local area network WLAN or as personal area network PAN access points for exchanging electromagnetic signals with one or more client devices configured to communicate with a WLAN or PAN access point or for becoming a client device on a WLAN or PAN network. In addition, one or more wireless network interface devices (208, 210 and 212) are configured to communicate with a satellite, (STN, GPS), radio, (AM/FM, two-way), television, infrared, or any other wireless network available in the network environment.

In a preferred embodiment the mobile router (140) comprises a first network interface device (202) comprising a 1×Evolution-Data Optimized, EVDO/1×RTT or just EVDO configured cellular PC card installed in a card slot connected to the network controller (142). In addition the EVDO configured interface device (202) is connected to an external 1.9 GHz PCS antenna (232) through a low loss microwave cable and bulkhead grommet. The EVDO cellular interface is a Code Division Multiple Access, (CDMA) wireless broadband data interface standard used by a large number of cellular network service provides and access to a cellular network over the EVDO configured interface device (202) is generally available wherever cellular access points are available.

In addition the preferred mobile router (140) comprises a second network interface device (218) comprising a wireless fidelity, Wi-Fi configured device for communicating with Wi-Fi configured client devices. The Wi-Fi or IEEE 802.11 communication standard and network architecture is used by many wireless local area network (WLAN) configured devices and its use is expanding to other devices such that most wireless network configured devices will be able to communicate with the Wi-Fi interface device (218).

Generally, the preferred embodiment described above operates as follows. Upon power up, the CPU (222) communicates with the first wireless network interface device (202) to initiate a search for available EVDO configured cellular network access points and selects an optimal cellular access point to communicate with. The CPU (222) may then initiate an action to make the first wireless network interface device (202) a client on the host EVDO configured cellular network (110) and to access services provided by the cellular network (110). In addition, the CPU (222) communicates with the second wireless interface device (218) to establish a WLAN (170) over a usable range and to initiate a search for available Wi-Fi configured client devices (172, 174) located within the usable range. Upon finding Wi-Fi devices, (172, 174), the CPU (222) assigns a Wi-Fi address to each WiFi configured client device and communicates to each WiFi configured client device that a network access point is available.

Thereafter, each Wi-Fi configured client device (172, 174) may communicate with the Wi-Fi interface device (218) using Wi-Fi network signals, e.g. to initiate a connection with the WAN (100) over the cellular network (110). The Wi-Fi network signals are received by the wireless network interface device (218), converted to digital signals readable by the CPU (222) and reconfigured by the CPU (222) as EVDO network signals and sent to the EVDO configured interface device (202) to be converted to analog radio signals and sent to the cellular network (110), and eventually the WAN (100). Upon receiving a return signal from the WAN (100) over the cellular network (110) in an EVDO format, the first wireless network interface device (202) converts the analog EVDO signal to a digital signal readable by the CPU (222) and the CPU (222) converts the return EVDO signal to a Wi-Fi signal and sends the return Wi-Fi signal to the designated wireless client device (172 or 174)

Thus according to one aspect of the present invention, the mobile router (140) acts as a wireless network signal converting device for converting a Wi-Fi formatted wireless signal to an EVDO formatted wireless signal and for converting an EVDO formatted wireless signal to a Wi-Fi formatted wireless signal.

In further aspects of operating the preferred mobile router (140), the CPU (222) is programmed to periodically update information about the wireless network environment by repeatedly checking the availability of a more desirable cellular access point and by repeatedly checking the status of client devices in the WLAN area (170). This is done to make sure the mobile router (140) stays continuously connected to the EVDO cellular network even as the mobile router moves with respect to the wireless environment. In addition, the wireless router (140) is programmed to repeatedly send update messages to the cellular network (110) to ensure that host cellular network does not terminate the client device connection due to inactivity. In addition, the wireless router (140) is programmed to perform cellular network access point hand offs without losing a connection with the host cellular network. In particular this is accomplished by continuously communicating with two more cellular access points to hand off communications to the best available access point or if warranted to divide communication traffic between two or more cellular access points to increase bandwidth or improve reliability as may be required.

Generally the preferred EVDO mobile router (140) including the external antenna (232) is capable of maintaining a continuous connection with a cellular network over most of the network environment. In particular, the external cellular antenna (232), especially when used with a signal amplifier has a range of approximately 30 miles, which is significantly better than the range of an average cell phone or PDA which is typically 0.5-8.0 miles. In addition, the external antenna interface (230) is easily connected with a built-in antenna on a vehicle, water craft, or aircraft when the mobile router (140) is being used therein.

In addition, the mobile router (140) may also include an external Wi-Fi antenna (246) optimized for 2.4 GHz signals and optionally including a signal amplifier to increase the usable range of the Wi-Fi network (170) and to gain access to another Wi-Fi network e.g. WLAN (160). In one particularly useful application of the mobile router (140) configured with an external Wi-Fi antenna (246), the router 140 may be used to access and become a client on a nearby Wi-Fi configured WLAN (160) and to gain access to a WAN (100) through the WLAN (160). In this case, the usable range of the network interface device (218) configured with a Wi-Fi optimized external antenna (246) will usually exceed the range of the client devices (172) and (174) which do not generally include a separate external Wi-Fi antenna. Thus the mobile router (140) may become a client device the WLAN (160) and exchange Wi-Fi signals directly between the client devices disposed within the WLAN (170) and the WLAN (160). The above described use of the mobile router (140) is particularly useful when the only available cellular network is a pay per use service and the WLAN (160) provides non-pay network access. To take advantage of this situation, the controller (142) is programmed to review all available wireless network access points and to select the best available notwithstanding the network type.

In further embodiments of the mobile router (140), additional cellular network interface devices (204) and (206) may be added to increase the type of cellular networks that can be accessed. Specifically, each cellular network interface device (202, 204, 206) may be configured to communicate with a different cellular network type to increase the likelihood that continuous cellular network access can be maintained. For example the device (202) is configured as an EDVO interface device for communicating with one or more EDVO networks. The device (204) is configured as an Enhanced Data rates for GSM Evolution, or EDGE interface device for communicating with one or more EDGE configured cellular networks. The device (206) is configured as another cellular interface device as may be required to communicate with another cellular network type including any one of, or a combination of, the Global System for Mobile Communications (GSM), General Packet Radio Service (GPRS), Code Division Multiple Access (CDMA), 3GSM, Digital Enhanced Cordless Telecommunications (DECT), Digital AMPS (IS-136/TDMA), and Integrated Digital Enhanced Network (iDEN) cellular network configurations.

In further embodiments of the mobile router (140), additional cellular network interface devices (204) and (206) may be added to increase the number of cellular network connections that can be established e.g. to increase the communication bandwidth capacity between the mobile router (140) and the cellular network (110). In this example each of the cellular network interface devices (202, 204, 206) may comprise an EDVO configured device and each of the EDVO configured devices can be configured to act as a separate client device on the host cellular network to increase bandwidth. Moreover, each EDVO device may have a different cellular network account or phone number and each device may have a different set of cellular network service options.

In further embodiments of the mobile router (140) variously configured wireless network interface devices (214, 216, 218) may be used to establish various wireless local area networks, e.g. (170, 180) and others to communicate with devices of various wireless network configurations. In addition two or more wireless network interfaces (214, 216, 218) may be configured as a single type network device to increase communication bandwidth and or to increase the number of client devices that can be supported. Specifically the wireless interface devices (214, 216, 218) may be configured according to any one of the Wi-Fi, IEEE 802.11, Bluetooth, IEEE 802.15, WiMax, IEEE 802.16 Home RF, Ultra Wide Band, UWB, Zigbee, IEEE 802.15.4, or other wireless networks standards or protocols.

In addition, the controller (142) may be configured to operate in various network environments such as a Mobile ad-hoc Network (MANET), a peer to peer, P2P networks, a mesh network, an infrared sensor network, or other network type and exchange signals from one network type to another as described above.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. a wireless cellular and wireless local area network environment, those skilled in the art will recognize that its usefulness is not limited thereto and that the present invention can be beneficially utilized in any number of environments and implementations including but not limited to any network environment. Accordingly, the claims set forth below should be construed in view of the full breadth and spirit of the invention as disclosed herein.

What we claim:

1. A mobile wireless router comprising:
a network controller comprising a CPU and an associated memory;
a plurality of cellular network interface devices in communication with the CPU;
a second wireless network interface device in communication with the CPU;
program steps operating on the mobile wireless router for establishing at least two of the plurality of cellular network interface devices as a client device of a first cellular network that provides access to a WAN;
program steps operating on the mobile wireless router for hosting client devices on a local area network operating over the second wireless network interface device;
programs steps operating on the mobile wireless router for aggregating network traffic received from the client devices hosted on the local area network together and for routing the aggregated network traffic between the client devices hosted on the local area network and the first cellular network to access the WAN; and,
program steps operating on the mobile wireless router for balancing the aggregated network traffic over the at least two of the plurality of cellular network interface devices operating as a client device on the first cellular network.

2. The mobile wireless router of claim 1 further comprising program steps operating on the mobile wireless router for receiving network traffic from the WAN over each of the at least two of the plurality of cellular network interface devices established as a client of the first cellular network and for routing the network traffic received from the WAN over each of the at least two of the plurality of cellular network interface devices to appropriate client devices hosted on the local area network over the second wireless network interface device.

3. The mobile wireless router of claim 2 wherein the second wireless network interface device comprises a plurality of second wireless network interface devices each in communication with the CPU, further comprising program steps operating on the mobile wireless router for hosting client devices on a plurality of local area networks established by two or more of the plurality of second wireless network interface devices.

4. The mobile wireless router of claim 3 wherein the plurality of second wireless network interface devices comprises a plurality of different second wireless network interface device types further comprising program steps operating on the mobile wireless router for hosting client devices on each of the plurality of different second local area network interface device types over a corresponding one of the plurality of different second wireless network interface device types.

5. The mobile wireless router of claim 4 wherein the plurality of different second wireless network interface device types are configured to operate a local area network using any one of: WiFi, WiMAx, Bluetooth, ZigBee and Utra-Wide-Band, network communication protocol standards.

6. The mobile wireless router of claim 4 wherein the plurality of different second wireless network interface device types includes at least one second wireless network interface device type operable to exchange network signals with network devices local to the mobile wireless router using any one of a Mobile ad-hoc Network (MANET), a peer to peer network, and a mesh network communication protocol.

7. The mobile wireless router of claim 1 wherein the first cellular network and each of the at least two of the plurality of cellular network interface devices operating as a client of the first cellular network is configured to operate using a first cellular network message exchange or communication protocol standard.

8. The mobile wireless router of claim 7 wherein the first cellular network message exchange or communication protocol standard comprises any one of Global System for Mobile Communications (GSM), General Packet Radio Service (GPRS), Universal Mobile Telecommunications System (UMTS), High-Speed Downlink Packet Access (HSDPA), High-Speed Uplink Packet Access (HSUPA), Code Division Multiple Access (CDMA), Evolution-Data Optimized (EVDO), Enhanced Data Rates for GSM Evolution (EDGE), 3GSM, Digital Enhanced Cordless Telecommunications (DECT), Digital AMPS (IS-136/TDMA), or Integrated Digital Enhanced Network (iDEN).

9. The mobile wireless router of claim 7 wherein the first cellular network comprises a plurality of first cellular network access points distributed over a geographic region further comprising program steps operating on the wireless router for simultaneously establishing each of the at least two of the plurality of cellular network interface devices that operate using the first cellular network message exchange or communication protocol as a client device of a first cellular network over a least two different first cellular network access points.

10. The mobile wireless router of claim 1 wherein the first cellular network comprises an Evolution-Data Optimized (EVDO) configured cellular network and each of the at least two of the plurality of cellular network interface devices operating as a client of the first cellular network is operable to access services provided by the first EVDO configured cellular network.

11. The mobile wireless router of claim 1:
wherein the first cellular network and each of the at least two of the plurality of cellular network interface devices established as a client device of the first cellular network operate using a first cellular network message exchange or communication protocol standard;
wherein at least one of the plurality of cellular network interface devices is operable to be established as a client of a second cellular network that provides access to the WAN;
wherein the second cellular network and the at least one of the plurality of cellular network interface devices operable to be established as a client of a second cellular network operate using a second cellular network message exchange or communication protocol standard that is different from the first cellular network message exchange or communication protocol standard; and,
program steps operating on the mobile wireless router for establishing the at least one of the plurality of cellular network interface devices operable to be established as a client of a second cellular network as a client device of the second cellular network.

12. The mobile wireless router of claim 11:
wherein the at least one of the plurality of cellular network interface devices operable to be established as a client of a second cellular network is established as a client of the second cellular network; and,
wherein the program steps operating on the mobile wireless router for routing the aggregated network traffic received from the client devices hosted on the local area network to the first cellular network to access the WAN are further operable to route a portion of the aggregated network traffic from the client devices hosted on the local area network and the second cellular network to access the WAN.

13. The mobile wireless router of claim 12 further comprising program steps operating on the mobile wireless router for:

receiving network traffic from the WAN over each of the at least two of the plurality of cellular network interface devices established as a client of the first cellular network;
receiving network traffic from the WAN over the at least one of the plurality of cellular network interface devices established as a client of the second cellular network;
routing all of the network traffic received from the WAN to appropriate client devices hosted on the local area network over the second wireless network interface device.

14. The mobile router of claim 12 further comprising program steps operating on the mobile wireless router for balancing the aggregated network traffic received from the client devices hosted on the local area network over all of the plurality of cellular network interface devices operating as a client of the first cellular network and operating as a client device of the second cellular network.

15. The mobile wireless router of claim 1 wherein the first cellular network and each of the at least two of the plurality of cellular network interface devices operating as a client of the first cellular network is operable to exchange radio signals over a frequency band ranging between 0.8 and 2.2 GHz.

16. The mobile router of claim 1 wherein the network controller comprises:
a printed circuit board comprising integrated circuit elements formed thereon and attached thereto including the CPU, the associated memory, each of the plurality of cellular network interface devices and the second wireless network interface device; and,
an electronic enclosure module configured to house the network controller therein.

17. The mobile router of claim 1 wherein the first cellular network includes a plurality of first cellular network access points distributed over a geographic region further comprising program steps operating on the CPU for repeatedly checking availability of first cellular network access points with more optimal characteristics as the mobile router moves with respect to the plurality of first cellular network access points.

18. The mobile router of claim 1 further comprising program steps operating on the CPU to repeatedly send update messages to the first cellular network to prevent the first cellular network from terminating communication with any of the at least two of the plurality of cellular network interface devices operating as a client of the first cellular network.

* * * * *